US006997484B1

(12) United States Patent  (10) Patent No.: US 6,997,484 B1
Hauk  (45) Date of Patent: Feb. 14, 2006

(54) PUMP DISCHARGE CONDUIT SYSTEM

(76) Inventor: Jeremy Hauk, P.O. Box 222, Ethan, SD (US) 57334

(*) Notice: Subject to any disclaimer, the term of this patent is extended or adjusted under 35 U.S.C. 154(b) by 0 days.

(21) Appl. No.: 10/671,214

(22) Filed: Sep. 25, 2003

(51) Int. Cl.
F16L 3/04 (2006.01)

(52) U.S. Cl. .............................. 285/139.2; 285/139.3; 285/206

(58) Field of Classification Search ............ 285/139.2, 285/139.1, 137.11, 206, 205, 139.3
See application file for complete search history.

(56) References Cited

U.S. PATENT DOCUMENTS

| | | | |
|---|---|---|---|
| 572,911 A * | 12/1896 | Schmidt | 285/206 |
| 985,853 A * | 3/1911 | Stewart | 285/139.1 |
| 1,000,538 A * | 8/1911 | Mueller | 285/139.1 |
| 1,003,179 A * | 9/1911 | Gruschow | 285/139.1 |
| 1,009,031 A * | 11/1911 | Millea | 285/137.11 |
| 1,107,289 A * | 8/1914 | Glauber | 285/139.1 |
| 1,212,797 A * | 1/1917 | Mueller et al. | 285/46 |
| 1,393,089 A * | 10/1921 | Hunter | 285/137.11 |
| 2,444,113 A * | 6/1948 | Pevney | 285/139.2 |
| 2,730,381 A * | 1/1956 | Curtiss | 285/139.1 |
| 3,260,539 A | 7/1966 | Herron | |
| 3,278,201 A * | 10/1966 | Noland | 285/46 |
| 3,365,215 A | 1/1968 | Arzt et al. | |
| 3,749,424 A * | 7/1973 | Greene | 285/139.1 |
| 3,851,898 A | 12/1974 | Ihara | |
| 3,880,553 A | 4/1975 | Wolford et al. | |
| 4,392,790 A | 7/1983 | Shibata et al. | |
| 4,564,041 A | 1/1986 | Kramer | |
| 4,620,817 A | 11/1986 | Cushing | |
| 5,110,157 A | 5/1992 | Chen | |
| 5,507,628 A | 4/1996 | Masse et al. | |
| 5,542,714 A * | 8/1996 | Messinger et al. | 285/136.1 |
| 5,882,508 A | 3/1999 | St-Jacques | |
| 5,906,479 A | 5/1999 | Hawes | |
| 5,971,444 A * | 10/1999 | Hawkins | 285/206 |
| 6,183,021 B1 * | 2/2001 | Walsh et al. | 285/139.2 |
| 6,289,532 B1 * | 9/2001 | Fritz et al. | 285/206 |
| 6,295,664 B2 * | 10/2001 | Fritz et al. | 285/206 |
| 6,729,657 B2 * | 5/2004 | Haymon | 285/139.1 |

* cited by examiner

Primary Examiner—David Bochna

(57) ABSTRACT

A pump discharge conduit system for allowing discharge from a pump to be discharged out of the structure. The pump discharge conduit system includes an output conduit being designed for extending through the wall of the structure. The output conduit comprises an inlet end and an outlet end. The inlet end of the output conduit is designed for being positioned in an interior of the structure whereby the inlet end is in fluid communication with the pump. The outlet end of the output conduit is positioned outside of the structure whereby the output conduit is for directing discharge from the pump to the outside of the structure through the outlet aperture.

15 Claims, 5 Drawing Sheets

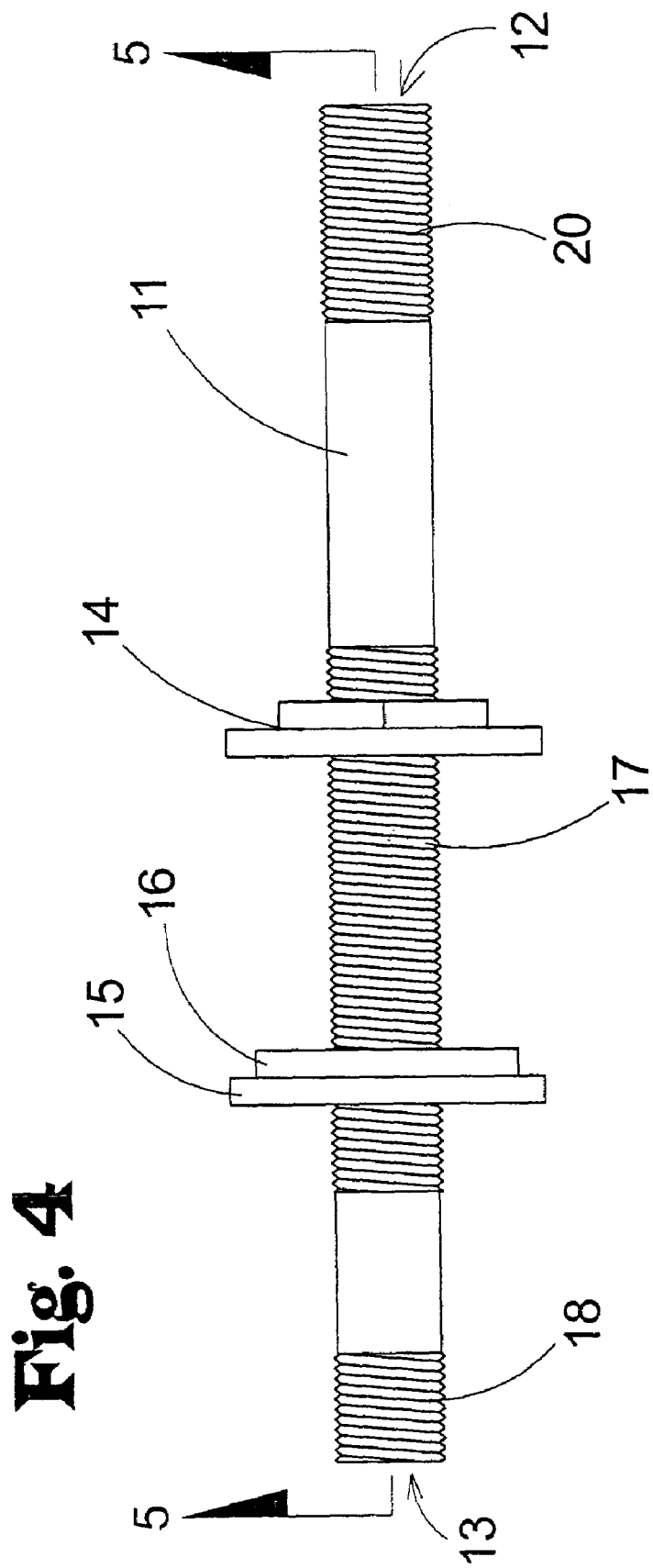

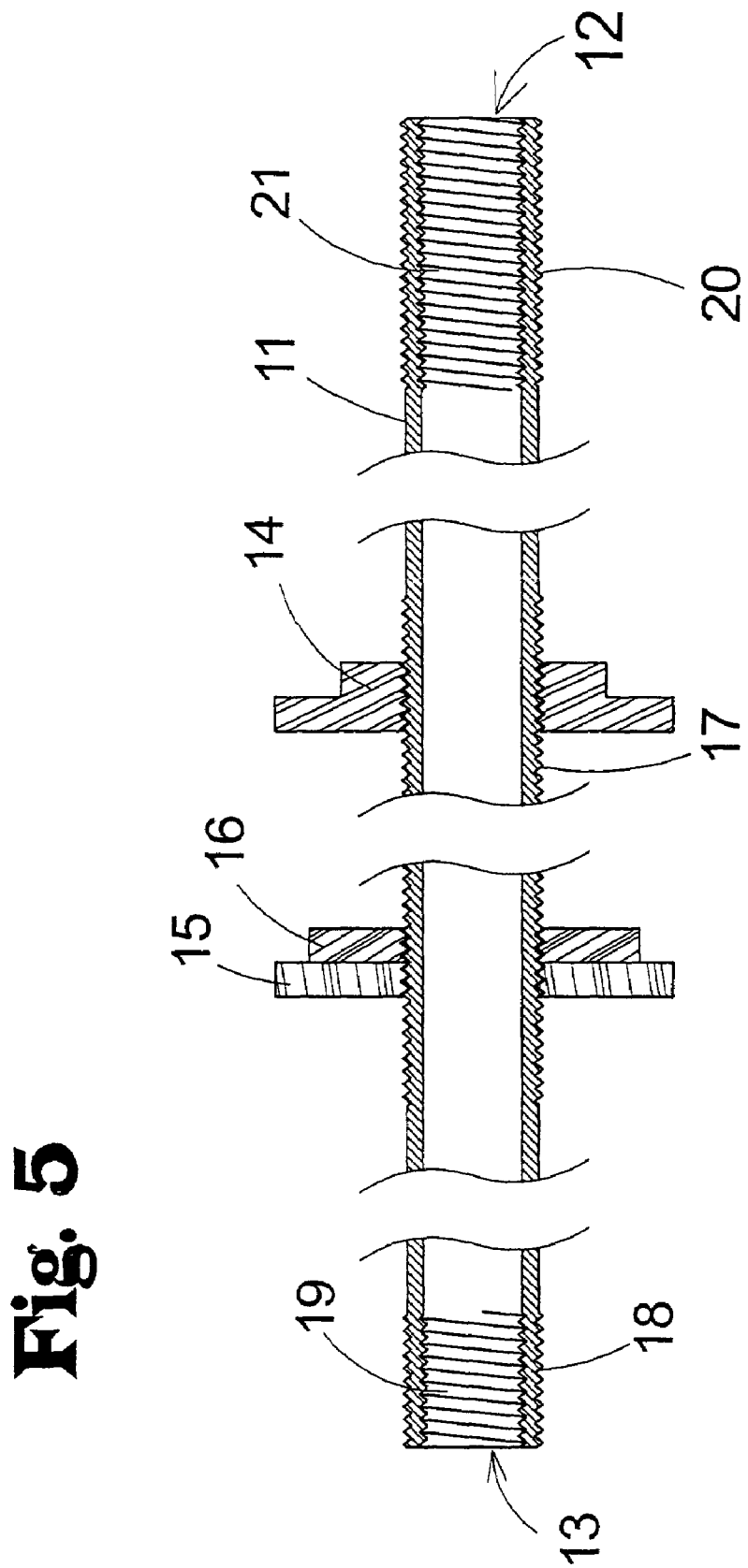

PUMP DISCHARGE CONDUIT SYSTEM

BACKGROUND OF THE INVENTION

1. Field of the Invention

The present invention relates to pipe connecting devices and more particularly pertains to a new pump discharge conduit system for allowing discharge from a pump to be discharged out of the structure.

2. Description of the Prior Art

The use of pipe connecting devices is known in the prior art. U.S. Pat. No. 5,110,157 describes a system for connecting joining a water faucet to a supply line. Another type of pipe connecting device is U.S. Pat. No. 3,851,898 having a pipe connecting device that is coupled to a submersible pump that maintains pumping efficiency over long periods of operation of the pump. U.S. Pat. No. 4,564,041 has a quick disconnect for allowing a sump pump to be readily disconnected and reconnected to a discharge conduit when the sump pump is raised and lowered. U.S. Pat. No. 3,365,215 has a flange extending outwardly from each of the tubes where the flanges are connected together to allow fluid communication between the tubes. U.S. Pat. No. 5,507,628 has a lift out coupling the allows a sump pump to be easily disconnected from and reconnected to a discharge pipe. U.S. Pat. No. 3,260,539 has a quick connecting coupler for facilitating disconnection and reconnection of fluid conduit. U.S. Pat. No. 4,392,790 has a coupling system allow for permitting an outlet of a submergible pump to be easily disconnected and reconnected to an inlet port of a discharge conduit. U.S. Pat. No. 5,906,479 has a universal pump coupling system for allowing various configurations of submersible pumps to be mounted in a pumping station. U.S. Pat. No. 3,880,553 has a pumping a system for allowing a submersible pump with a detachable coupling to engage a discharge conduit to allow the submersible pump when the submersible pump is lowered into the wet well. U.S. Pat. No. 4,620,817 having an underground pipe extending away from a sump pump or a downspout that disperses water into the soil or into a tank that bleeds the water into the soil. U.S. Pat. No. 5,882,508 has a cleaning system for a gutter to allow for easy cleaning of gutter and eaves to ensure proper operation of the gutters.

While these devices fulfill their respective, particular objectives and requirements, the need remains for a system that has certain improved features that maintains positioning of an output conduit extending through the wall of a structure.

SUMMARY OF THE INVENTION

The present invention meets the needs presented above by providing a retaining member and a backing member coupled to the output conduit on opposite side of the wall to inhibit movement of the output conduit with respect to the wall.

Still yet another object of the present invention is to provide a new pump discharge conduit system that seals the area of the wall around the output conduit to inhibit environmental elements, such as rain and snow, and insects from entering the structure between the wall and output conduit.

Even still another object of the present invention is to provide a new pump discharge conduit system that allows the backing member to match the angle of the exterior face of wall.

To this end, the present invention generally comprises an output conduit being designed for extending through the wall of the structure. The output conduit comprises an inlet end and an outlet end. The inlet end of the output conduit is designed for being positioned in an interior of the structure whereby the inlet end is in fluid communication with the pump. The outlet end of the output conduit is positioned outside of the structure whereby the output conduit is for directing discharge from the pump to the outside of the structure through the outlet aperture.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a side view of the present invention for use with a flat exterior surface of the wall.

FIG. 5 is a cross-sectional view of the present invention as taken along line 5—5 of FIG. 4.

DESCRIPTION OF THE PREFERRED EMBODIMENT

Figure 1:
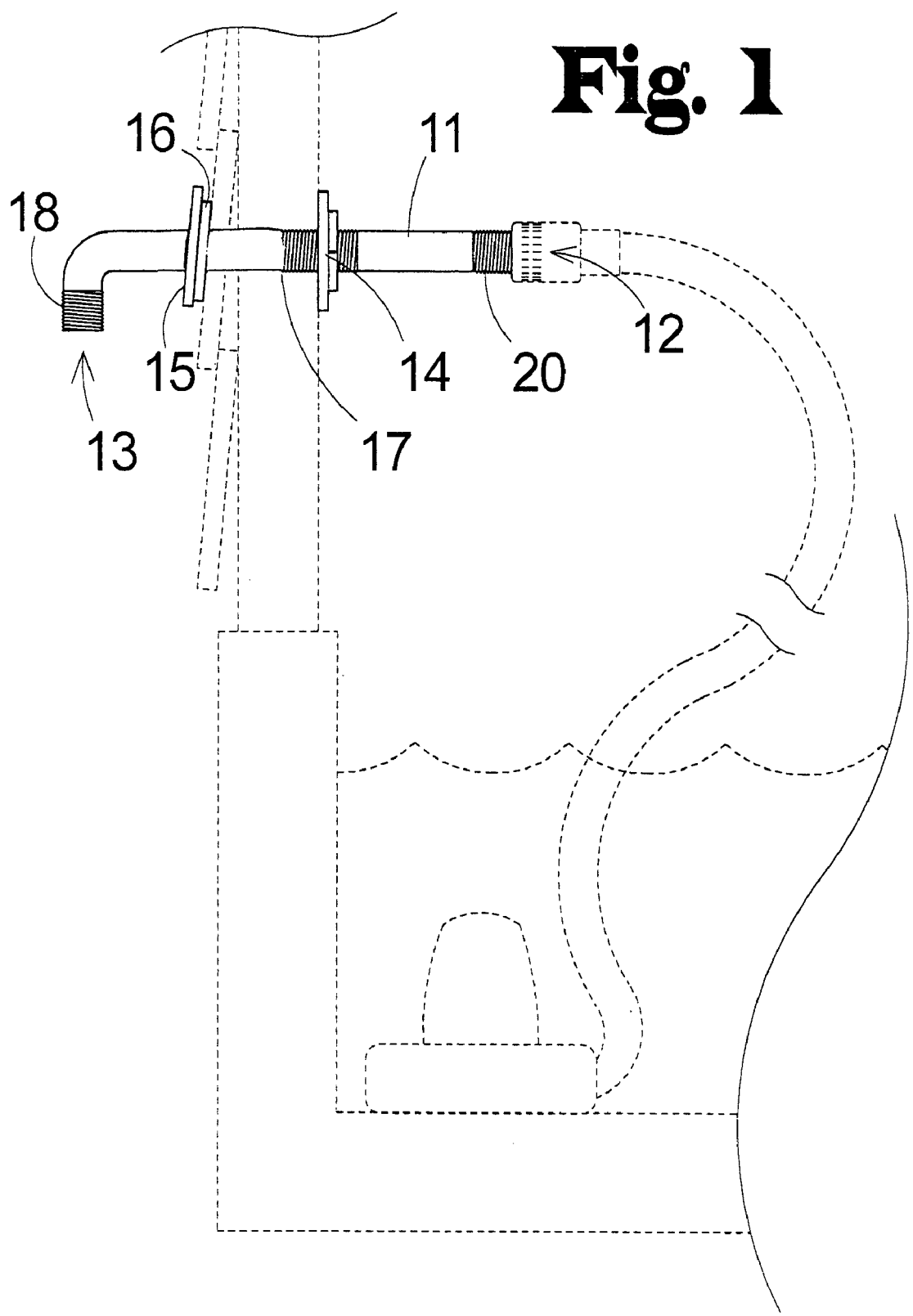
FIG. 1 is a side view of a new pump discharge conduit system with the bend according to the present invention shown in use.
Figure 2:
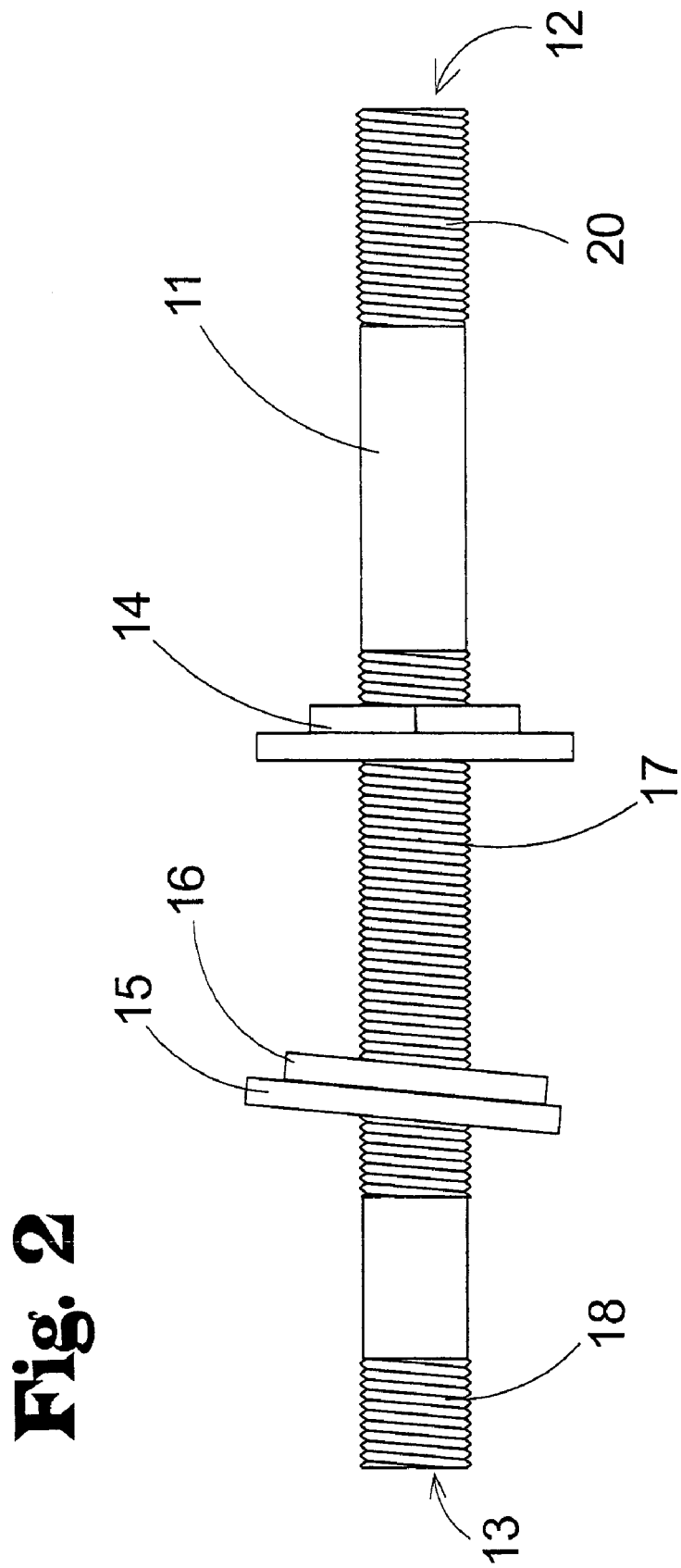
FIG. 2 is a side view of the present invention.
Figure 3:
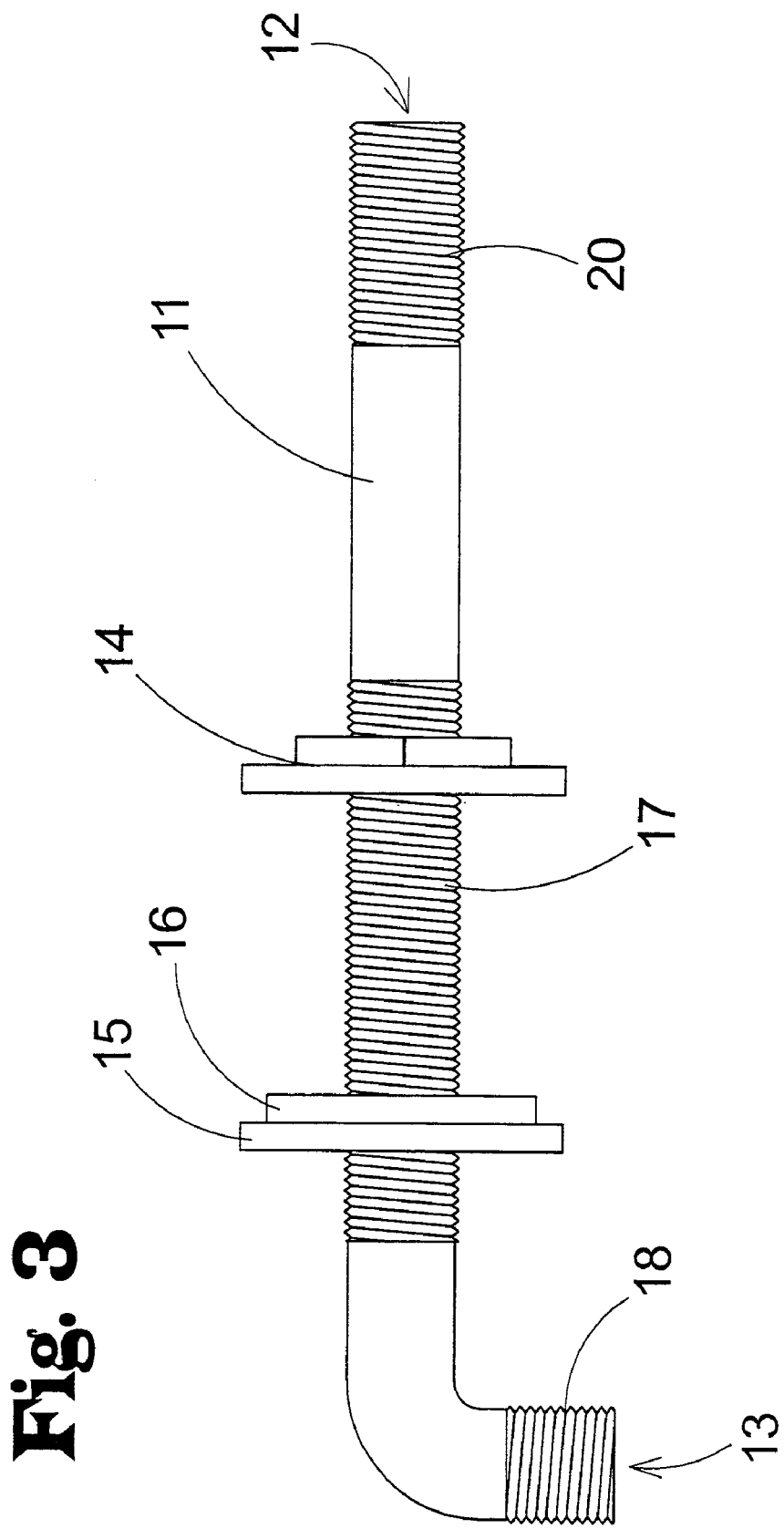
FIG. 3 is a side view of the present invention with the bend for use with a flat exterior surface of the wall.

With reference now to the drawings, and in particular to FIGS. 1 through 5 thereof, a new pump discharge conduit system embodying the principles and concepts of the present invention and generally designated by the reference numeral 10 will be described.

As best illustrated in FIGS. 1 through 5, the pump discharge conduit system 10 generally comprises an output conduit 11 being designed for extending through the wall of the structure. The output conduit 11 comprises an inlet end 12 and an outlet end 13. The inlet end 12 of the output conduit 11 is designed for being positioned in an interior of the structure whereby the inlet end 12 is in fluid communication with the pump. The outlet end 13 of the output conduit 11 is positioned outside of the structure whereby the output conduit 11 is for directing discharge from the pump to the outside of the structure through the outlet aperture. The output conduit 11 is about 2 inches in diameter and between about 22 inches and 24 inches in length.

A retaining member 14 is selectively coupled to the output conduit 11 whereby the retaining member 14 extends outwardly from the output conduit 11. The retaining member 14 is designed for abutting an interior face of the wall of the structure that the output conduit 11 extends through to inhibit sliding of the output conduit 11 with respect to the wall.

A backing member 15 is integrally coupled to the output conduit 11, as shown in FIG. 1, whereby the backing member 15 extends outwardly from the output conduit 11. Alternately, the backing member 15 may be selectively coupled to the output conduit 11, as shown in FIGS. 2 through 5. The backing member 15 is positioned in spaced relationship to the retaining member 14 whereby the backing member 15 is designed for abutting an exterior face of the wall of the structure. The backing member 15 and the retaining member 14 are designed for pressing against the wall to inhibit sliding of the output conduit 11 with respect to the wall.

A seal member 16 is selectively positioned around the output conduit 11. The seal member 16 abuts against the backing member 15 whereby the seal member 16 is designed for being positioned between the backing member 15 and the wall of the structure. The seal member 16 is designed for sealing an area of the wall adjacent the output conduit 11 whereby the seal member 16 is designed for inhibiting environmental elements and insects from entering the structure between the wall and the output conduit 11. The seal member 16 comprises a flexible material. The flexible material is designed for conforming to a shape of the wall and filling any gaps between the wall and the output conduit 11 to inhibit the environmental elements and insects from entering the structure between the wall and the output conduit 11.

The output conduit 11 comprises a positioning thread 17. The positioning thread 17 is positioned between the inlet end 12 and the output end. In the alternate, as shown in FIGS. 2 through 5, the backing member 15 threadably engages the positioning thread 17 whereby rotation of the backing member 15 with respect to the output conduit 11 changes the positioning of the backing member 15 along the output conduit 11. The retaining member 14 threadably engages the positioning thread 17 whereby rotation of the retaining member 14 with respect to the output conduit 11 changes the positioning of the retaining member 14 along the output conduit 11 to permit the backing member 15 and the retaining member 14 to be adjusted to accommodate the wall positioned between the backing member 15 and the retaining member 14.

The output conduit 11 comprises an exterior outlet thread 18. The exterior outlet thread 18 is positioned adjacent the outlet end 13 of the output conduit 11 whereby the exterior outlet thread 18 is positioned in an exterior surface of the output conduit 11. The exterior outlet thread 18 is designed for being threadably engaged by a female drainage coupling to allow drainage piping to be coupled to the output conduit 11 to direct the discharge from the pump away from the output conduit 11.

The output conduit 11 comprises an interior outlet thread 19. The interior outlet thread 19 is positioned adjacent the outlet end 13 of the output conduit 11 whereby the interior outlet thread 19 is positioned in an interior surface of the output conduit 11. The interior outlet thread 19 is designed for being threadably engaged by a male drainage coupling to allow drainage piping to be coupled to the output conduit 11 to direct the discharge from the pump away from the output conduit 11.

The output conduit 11 comprises an exterior inlet thread 20. The exterior inlet thread 20 is positioned adjacent the inlet end 12 of the output conduit 11 whereby the exterior inlet thread 20 is positioned in an exterior surface of the output conduit 11. The exterior inlet thread 20 is designed for being threadably engaged by a female discharge coupling to allow discharge piping from the pump to be coupled to the output conduit 11 to direct the discharge from the pump into the output conduit 11.

The output conduit 11 comprises an interior inlet thread 21. The interior inlet thread 21 is positioned adjacent the inlet end 12 of the output conduit 11 whereby the interior inlet thread 21 is positioned in an interior surface of the output conduit 11. The interior inlet thread 21 is designed for being threadably engaged by a male discharge coupling to allow discharge piping from the pump to be coupled to the output conduit 11 to direct the discharge from the pump into the output conduit 11.

In an embodiment, the backing member 15 is positioned at an oblique angle to the output conduit 11. The backing member 15 is designed for abutting against an oblique exterior face of the wall to allow the backing member 15 to apply force against the wall evenly to prevent the backing member 15 from damaging the wall when the backing member 15 abuts the wall.

In an embodiment, the output conduit 11 comprises a bend positioned between the positioning thread 17s and the outlet end 13 of the output conduit 11. The bend positions the outlet end 13 at an angle to allow the outlet end 13 to directed in a desired direction to facilitate the discharge of the pump being directed away from the structure.

In use, the user forms a hole in the wall of the structure and inserts the output conduit 11 into the hole extending through the wall, alternately the output conduit 11 may be inserted into wet concrete so that the output conduit 11 is set in the concrete as it dries. The seal member 16 is positioned on the output conduit 11 so that the seal member 16 is positioned against the exterior face of the wall. The backing member 15 is positioned on the output conduit 11 and engages the positioning thread 17 and is rotated until the backing member 15 abuts the seal member 16. The retaining member 14 is positioned on the output conduit 11 until the retaining member 14 engages the positioning thread 17 and is rotated until the retaining member 14 abuts the wall and backing member 15 is drawn against the wall so that the seal member 16 seals the area of the wall around the output conduit 11. The discharge piping from the pump is coupled to the inlet end 12 of the output conduit 11 and the drainage piping is coupled to the outlet end 13 of the output conduit 11 to allow the discharge from the pump to exit the structure to the outside environment and away from the structure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pump discharge conduit system for extending through a wall of a structure to allow a pump to discharge outside of the structure, the pump discharge conduit system comprising:

an output conduit being adapted for extending through the wall of the structure, said output conduit comprising an inlet end and an outlet end, said inlet end of said output conduit being adapted for being positioned in an interior of the structure such that said inlet end is in fluid communication with the pump, said outlet end of said output conduit is positioned outside of the structure such that said output conduit is for directing discharge from the pump to the outside of the structure through said outlet aperture;

a retaining member being selectively coupled to said output conduit such that said retaining member extends outwardly from said output conduit, said retaining member being adapted for abutting an interior face of the wall of the structure that said output conduit extends through to inhibit sliding of said output conduit with respect to the wall;

a backing member being coupled to said output conduit such that said backing member extends outwardly from said output conduit, said backing member being positioned in spaced relationship to said retaining member such that said backing member is adapted for abutting an exterior face of the wall of the structure, said backing member and said retaining member being adapted for pressing against the wall to inhibit sliding of said output conduit with respect to the wall;

said backing member being positioned at an oblique angle to said output conduit, said backing member being adapted for abutting against an oblique exterior face of the wall to allow said backing member to apply force against the wall evenly to prevent said backing member from damaging the wall when said backing member abuts the wall; and a seal member being selectively positioned around said output conduit, said seal member abutting against said backing member such that said seal member is adapted for being positioned between said backing member and the wall of the structure, said seal member being adapted for sealing an area of the wall adjacent said output conduit such that said seal member is adapted for inhibiting environmental elements and insects from entering the structure between the wall and said output conduit;

said output conduit comprising a positioning thread, said positioning thread being positioned between said inlet end and said output end, said backing member threadably engaging said positioning thread such that rotation of said backing member with respect to said output conduit changes the positioning of said backing member along said output conduit, said retaining member threadably engaging said positioning thread such that rotation of said retaining member with respect to said output conduit changes the positioning of said retaining member along said output conduit to permit said backing member and said retaining member to be adjusted to accommodate the wall positioned between said backing member and said retaining member.

2. The pump discharge conduit system as set forth in claim 1, further comprising:

said seal member comprising a flexible material, said flexible material being adapted for conforming to a shape of the wall and filling any gaps between the wall and said output conduit to inhibit the environmental elements and insects from entering the structure between the wall and the output conduit.

3. The pump discharge conduit system as set forth in claim 1, further comprising:

said output conduit comprising an exterior outlet thread, said exterior outlet thread being positioned adjacent said outlet end of said output conduit such that said exterior outlet thread is positioned in an exterior surface of said output conduit, said exterior outlet thread being adapted for being threadably engaged by a female drainage coupling to allow drainage piping to be coupled to said output conduit to direct the discharge from the pump away from the output conduit.

4. The pump discharge conduit system as set forth in claim 3, further comprising:

said output conduit comprising a positioning thread, said positioning thread being positioned between said inlet end and said output end, said retaining member threadably engaging said positioning thread such that rotation of said retaining member with respect to said output conduit changes the positioning of said retaining member along said output conduit to permit said backing member and said retaining member to be adjusted to accommodate the wall positioned between said backing member and said retaining member.

5. The pump discharge conduit system as set forth in claim 1, further comprising:

said output conduit comprising an interior outlet thread, said interior outlet thread being positioned adjacent said outlet end of said output conduit such that said interior outlet thread is positioned in an interior surface of said output conduit, said interior outlet thread being adapted for being threadably engaged by a male drainage coupling to allow drainage piping to be coupled to said output conduit to direct the discharge from the pump away from the output conduit.

6. The pump discharge conduit system as set forth in claim 1, further comprising:

said output conduit comprising an exterior inlet thread, said exterior inlet thread being positioned adjacent said inlet end of said output conduit such that said exterior inlet thread is positioned in an exterior surface of said output conduit, said exterior inlet thread being adapted for being threadably engaged by a female discharge coupling to allow discharge piping from the pump to be coupled to said output conduit to direct the discharge from the pump into the output conduit.

7. The pump discharge conduit system as set forth in claim 1, further comprising:

said output conduit comprising an interior inlet thread, said interior inlet thread being positioned adjacent said inlet end of said output conduit such that said interior inlet thread is positioned in an interior surface of said output conduit, said interior inlet thread being adapted for being threadably engaged by a male discharge coupling to allow discharge piping from the pump to be coupled to said output conduit to direct the discharge from the pump into the output conduit.

8. The pump discharge conduit system as set forth in claim 1, further comprising:

said backing member being integrally coupled to said output conduit such that said backing member extends outwardly from said output conduit, said retaining member being positioned in spaced relationship to said backing member such that said backing member is adapted for abutting an exterior face of the wall of the structure, said backing member and said retaining member being adapted for pressing against the wall to inhibit sliding of said output conduit with respect to the wall.

9. A pump discharge conduit system for extending through a wall of a structure to allow a pump to discharge outside of the structure, the pump discharge conduit system comprising:

an output conduit for extending through the wall of the structure for directing discharge from the pump to the outside of the structure, the output conduit comprising an inlet end for positioning in an interior of the structure and an outlet end for positioning outside of the structure;

wherein the output conduit has an exterior surface, the exterior surface having an inlet portion located adjacent to the inlet end and an outlet portion located adjacent to the output end, the exterior surface of the output conduit having a medial portion located between the inlet portion and the outlet portion of the exterior surface;

wherein the exterior surface of the output conduit has an inner intermediate portion between the medial portion and the inlet portion of the exterior surface, and the exterior surface of the output conduit has an outer intermediate portion between the medial portion and the outlet portion of the exterior surface;

wherein each of the inlet, outlet, and medial portions of the exterior surface is exteriorly threaded; and wherein each of the inner intermediate portion and outer intermediate portion of the exterior surface is smooth and free of exterior threads;

a backing member having an aperture through which the output conduit extends, the backing member being removably coupled to the medial portion of the exterior surface of the output conduit by interior threads formed on the aperture of the backing member;

wherein the backing member has a substantially planar inward surface extending radially outwardly from the aperture of the backing member toward an outer perimeter of the backing member;

wherein the inward surface of the backing member is oriented at an oblique angle to a longitudinal axis of the output conduit when the backing member is threaded onto the exterior surface of the output conduit for permitting the backing member to abut against an oblique outer surface of the wall in a substantially uniform manner.

10. The pump discharge conduit system as set forth in claim 9, further comprising a retaining member having an aperture through which the output conduit extends, the retainer member being removably coupled to the medial portion of the exterior surface of the output conduit by interior threads formed on the aperture of the retaining member such that the retaining member is capable of acting in opposition to the backing member when the wall is positioned between the backing member and the retaining member.

11. The pump discharge conduit system as set forth in claim 9, further comprising a seal member positioned against the inward surface of the backing member for positioning between the backing member and the wall when the output conduit is positioned through the wall.

12. A pump discharge conduit system for extending through a wall of a structure to allow a pump to discharge outside of the structure, the pump discharge conduit system comprising:

an output conduit for extending through the wall of the structure for directing discharge from the pump to the outside of the structure, the output conduit comprising an inlet end for positioning in an interior of the structure and an outlet end for positioning outside of the structure;

wherein the output conduit has an exterior surface, the exterior surface having an inlet portion located adjacent to the inlet end and an outlet portion located adjacent to the output end, the exterior surface of the output conduit having a medial portion located between the inlet portion and the outlet portion of the exterior surface, each of the inlet, outlet, and medial portions of the exterior surface being exteriorly threaded;

a backing member having an aperture through which the output conduit extends, the backing member being removably coupled to the medial portion of the exterior surface of the output conduit by interior threads formed on the aperture of the backing member;

wherein the backing member has a substantially planar inward surface extending radially outwardly from the aperture of the backing member toward an outer perimeter of the backing member;

wherein the inward surface of the backing member is oriented at an oblique angle to a longitudinal axis of the output conduit when the backing member is threaded onto the exterior surface of the output conduit for permitting the backing member to abut against an oblique outer surface of the wall in a substantially uniform manner.

13. The pump discharge conduit system as set forth in claim 12, further comprising a retaining member having an aperture through which the output conduit extends, the retainer member being removably coupled to the medial portion of the exterior surface of the output conduit by interior threads formed on the aperture of the retaining member such that the retaining member is capable of acting in opposition to the backing member when the wall is positioned between the backing member and the retaining member.

14. The pump discharge conduit system as set forth in claim 12, further comprising a seal member positioned against the inward surface of the backing member for positioning between the backing member and the wall when the output conduit is positioned through the wall.

15. The pump discharge conduit system as set forth in claim 12 wherein the exterior surface of the output conduit has an inner intermediate portion between the medial portion and the inlet portion of the exterior surface, and the exterior surface of the output conduit has an outer intermediate portion between the medial portion and the outlet portion of the exterior surface; and wherein each of the inner intermediate portion and outer intermediate portion of the exterior surface is smooth and free of exterior threads.

* * * * *